United States Patent Office 3,061,558
Patented Oct. 30, 1962

3,061,558
FOAMED COMPOSITION COMPRISING A VINYL RESIN PLASTISOL AND A SILOXANE-OXYALKYLENE BLOCK COPOLYMER AND METHOD OF MAKING SAME
Harvey Alter, Adelphi, Md., assignor to Union Carbide Corporation, a corporation of New York
No Drawing. Filed Jan. 14, 1960, Ser. No. 2,344
18 Claims. (Cl. 260—2.5)

This invention relates to vinyl foam compositions and more particularly to vinyl foam compositions providing vinyl foams having more uniform internal and surface cell texture.

It is known to produce vinyl foam from plastisols of a vinyl resin. These plastisols are compositions comprising finely divided vinyl resin, i.e., vinyl chloride polymer or copolymer suspended in a liquid organic plasticizer for the polymer or copolymer. At ordinary temperatures the resin particles are only very slightly soluble in the plasticizer and the compositions are fluid, but upon being heated to an elevated temeprature the resin particles undergo fusion and solvation in the plasticizer. When a foaming agent, such as gases like carbon dioxide or liquids such as Freons, low boiling chlorinated hydrocarbons, are incorporated into the plastisol, a foam or foamable plastisol composition results, which upon heating to the fusion temperature of the plastisol forms a cellular plasticized solid resin which comprises either a sponge-like interconnecting cell structure or a structure wherein most of the cells are closed.

The cellular plasticized solid resin is a finished vinyl foam and is useful in a wide variety of articles, and especially as cushions and padding. In these latter applications load bearing and "bounce" properties, appearance, resilience and breathability are highly important. Nonuniformity in internal cell structure and varying ratios of open cells to closed cells adversely affects load bearing and bounce properties. Irregular surface texture is unattractive and affects breathability of the formed foam articles. One cause of nonuniform internal and surface cell structure is the variation from lot-to-lot of the vinyl resin foamed. As is known, the preparation of a foam is in large measure dependent upon the surface chemistry of the foamed materials, especially in nonaqueous systems such as plastisols used to produce vinyl foams. These nonaqeous systems are thermodynamically more difficult to foam and less easily stabilized than aqueous foam systems. Vinyl resins are usually produced by an emulsion or suspension technique and as shipped contain residual soaps and other materials that are potentially surface active. In addition, process variables in the manufacturing steps for the resin often result in resin particles varying from batch to batch in surface area, shape and wettabilities. The presence of surface active foreign material on the vinyl resin particles and other variations in the vinyl resins often interfere in the foaming of compositions containing such as these vinyl resin particles. These difficulties can be overcome by making a separate composition formulation for each batch of resins taking into account the peculiarities of each batch. But this is obviously a time-consuming and expensive procedure unacceptable for production of commercial quantities of foam structures. Commercial practice requires the simplicity of a single formulation for foam compositions irrespective of small batch-to-batch vinyl resin variations. Ideally, this single formulation would provide the same quality foam with regard to texture, etc., from different lots of resin.

A widely used method for producing vinyl foams is one disclosed by E.H. Schwencke in U.S.P. 2,666,036.

The method, in general, comprises forming a plastisol of vinyl resin, introducing a gas into the plastisol under pressure and with agitation and discharging the resulting foam into a mold or the like and curing. The Schwencke process is highly advantageous in that for the first time, a cellular plasticized vinyl resin is produced possessing many desirable properties. However, a number of problems arise in the use of this process, for example: Foams obtained with the same formulation sometimes vary in quality with the various resins used, and adjustment and careful control of the process is necessary. Flow characteristics of the foamed resin can also be erratic unless care is exercised, and consequently the farthest reaches of a mold may on occasion not be filled. The finished foam sometimes exhibits nonuniform internal cell structure, nonuniform surface texture, varying ratios of open to closed cells, often depending on the amount of moisture in the plastisol.

It is an object, therefore, of the present invention to provide a vinyl foam composition which yields vinyl foam having highly uniform internal cell structure and surface texture.

It is another object to provide a vinyl foam composition, the formulation of which is suitable for many vinyl resins despite variations in the vinyl resins from batch to batch.

It is a still further object of the present invention to provide a method for producing vinyl foam which flows easily in all recesses of the mold.

In general, these objects are achieved in nonaqueous vinyl foam compositions comprising a vinyl resin plastisol by the use of an amount of a siloxane-oxyalkylene block copolymer composition. It has been discovered that the addition of even slight amounts of a block copolymer obviates painstaking and time-consuming procedure of individually formulating a foam composition for each batch of vinyl resin. Such addition simplifies and expedites formulation of a composition providing a consistently satisfactory product and enhances product quality and product uniformity. Flow properties are also improved. With the compositions of this invention, improper filling of mold recesses, corners and edges is no longer a problem. Improved wet foam flow improves mold fillout and reduces voids in the finished foam piece.

The siloxane-oxyalkylene block copolymer compositions useful in this invention have a molecular weight above about 150, preferably from 2000 to 200,000, and comprise a mixture of block copolymers wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded to one end of the siloxane polymer through a carbon-oxy-silicon bond and bonded at the other end to a monoether radical.

In particular, suitable block copolymers are those which contain from about 5 to about 95 percent by weight of siloxane polymer and from 95 to 5 percent by weight of alkylene oxide polymer.

For the most part, the copolymers comprise predominantly dihydrocarbon siloxane units and oxyalkylene units and can contain one or more, but preferably not more than two or three mono-hydrocarbon siloxane units (i.e., not more than two or three trifunctional silicon atoms). The siloxane units are present in combinations of three or more units forming a chain which comprise the polysiloxane block or blocks of the copolymer.

Thus, one type of block copolymer adapted for use in the vinyl plastisol foam compositions of this invention can be represented by the following general formula:

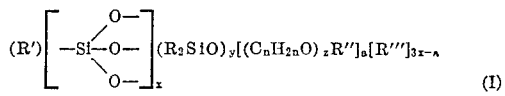
(I)

where R' is a hydrocarbon radical having the valence of $x$, R and R'' are monovalent hydrocarbon radicals, R''' is a member of the group consisting of alkyl radicals and $R_3Si-$ radicals, $x$ is an integer having a value of at least 1, $y$ is an integer having a value of at least 3, $n$ is an integer having a value of 2 to 4, $a$ is an integer having a value of at least one and not greater than $3x$ and $z$ is an integer having a value of at least 5. It will be understood further that these compounds are mixtures of block copolymers wherein $y$ and $z$ are of different values and that methods of determining the chain length of the polysiloxane chains, and the polyoxyalkylene chains give values which represent average chain lengths.

With reference to Formula I above, there is at least one oxyalkylene chain joined to a siloxane chain through a Si—O—C bond, and when $a=1$ and $x=1$, there are two alkyl or trihydrocarbonsilyl groups R''' terminating siloxane chains. However, when $a=3$ and $x=1$, there are no such groups present.

One type of block copolymer is represented when $x$ in Formula I is one, and in this instance, a branched-chain formula may be postulated as follows:

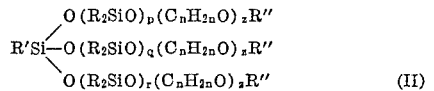
(II)

where $p+q+r=y$ of Formula I and has a minimum value of 3, the other subscripts being the same as in Formula I. In this instance, all three of the oxyalkylene chains are joined to the end of polysiloxane chains of the type $-(R_2SiO)_y-$. However, another type of branched-chain block copolymer exists when one of the oxyalkylene chains is attached through an oxygen atom to the trifunctional silicon atom bonded only to a single hydrocarbon radical (R'). This formula may be given as follows:

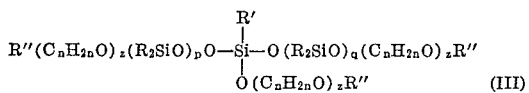
(III)

where $p+q=y$ of Formula I and has a minimum value of 3.

Another type of block copolymer is represented when there are present therein two trifunctional silicon atoms, each bonded to a single divalent hydrocarbon radical, and, correspondingly, present therein are six polyoxyalkylene chains. Such block copolymers may be represented by the formula:

$$(O_3SiR'SiO_3)(H_2SiO)_y[(C_nH_{2n}O)_zR'']_6 \quad (IV)$$

wherein R, R'', $y$, $n$ and $z$ are as designated for Formula I, R' is a divalent hydrocarbon radical. Expressed in structural form these block copolymers may be represented by the following formula:

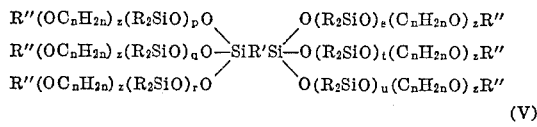
(V)

where $p+q+r+s+t+u$ is equal to $y$ of Formula I and in this instance has a minimum value of 6.

The above-described siloxane-oxyalkylene block copolymers can be prepared in accordance with the procedures described and claimed in U.S. Patent 2,834,748, to D. L. Bailey and F. M. O'Connor, herewith incorporated by reference wherein these copolymers are more particularly described.

The block copolymers can be added to the foam formulation at any time prior to actual foaming of the plastisol, for example by pre-adsorbing the block copolymer on the solid vinyl resin prior to formation of the plastisol or by adding after the vinyl resin is mixed with the plasticizer.

The amount of block copolymer added is not narrowly critical with any amount being beneficial in results obtained. Improvement in flow properties and texture can be noticed with as little as 0.01 part by weight or less of the copolymer per 100 parts by weight of the vinyl resin. The upper limit on concentration is that amount above which an undesirable amount of exudation from the surface of the foam articles occurs. Generally, this occurs where the solubility limit of the copolymer in the vinyl foam has been exceeded. The preferred concentration for a given siloxane-oxyalkylene block copolymer in a particular vinyl foam composition is at about the minimum of a surface tension versus concentration curve for solution of the copolymer in the liquid phase of the foam composition.

The use of block copolymers as described above is advantageous with all vinyl resins, homopolymers and copolymers which can be foamed in nonaqueous systems.

The siloxane-oxyalkylene block copolymers described herein are employed in vinyl resin plastisols, i.e., 2-phase systems in which a vinyl resin in small particulate form is dispersed and suspended in a plasticizer for the resin which has little or no solvating action on the resin at room temperature but will dissolve the resin at elevated temperature and cause it to fuse into a plasticized structure, and can be foamed by any technique known in the art, such as by the process described and claimed in Schwencke U.S. 2,666,036 which is herewith incorporated by reference. The term "vinyl resin" as used herein is meant to includes the vinyl chloride homopolymers and the copolymers, interpolymers and terpolymers of vinyl chloride with other ethylenically unsaturated monomers, and mixtures of the homopolymers with other vinyl chloride copolymers, interpolymers and terpolymers, and particularly those vinyl chloride resins containing a predominant amount of vinyl chloride polymerized therein, i.e., at least about 50 percent by weight and more. The preferred vinyl resins employed in this invention are those containing from 60 to 100 percent by weight of vinyl chloride in polymeric form.

The ethylenically unsaturated monomers which can be polymerized with vinyl chloride to form the copolymers, interpolymers and terpolymers include, for example, lower alkyl unsaturated esters, particularly vinyl acetate, partially hydrolyzed vinyl acetate, diethylmaleate, vinyl benzoate and the like, lower alkyl acrylates, such as methyl acrylate, ethyl acrylate, butyl acrylate, octyl acrylate and the like, as well as the corresponding methacrylates, alkyl esters of unsaturated acids such as maleic and fumaric acids, as well as other copolymerizable compounds as unsaturated nitriles, for example, acrylonitrile, halogenated hydrocarbons such as vinylidene chloride and fluoride, vinyl fluoride, chlorotrifluoroethylene and like compounds and other polymerizable compounds containing ethylenic unsaturation. Of the copolymers, particularly preferred are the vinyl chloride-vinyl acetate copolymers, particularly those containing 85 percent or more of vinyl chloride polymerized therein.

The physical properties of the plastisol which is utilized have been found to be quite important. Ordinarily, plastisols are classified into three groups according to viscosity. Those having viscosities of less than 10,000 centipoises are generally considered low viscosity plastisols. The intermediate range is 10,000 to 50,000 centipoises, and plastisols with viscosities of 50,000 centipoises and above are considered to be high viscosity plastisols. Experience has shown that both the low and intermediate viscosity plastisols can generally always be satisfactorily foamed by the process of this invention with significant ease. While certain of the high viscosity plastisols (frequently called pastes) are somewhat viscous for satisfactory incorporation of the gaseous foaming agent, the use of normally liquid foaming agents of this invention or of volatile thinners can lower the viscosity of these high viscosity plastisols for satisfactory foaming. Generally, the vinyl resin plastisols are made to have from 30 to 70 weight percent of plasticizer, however, depending upon the desired plasticity of the resultant foam and the viscosity of the plastisol secured, greater or lesser amounts may be used.

In most instances emulsion polymerized stir-in type vinyl resins are preferred to grinding-type because the larger particle size of the stir-in resins produces a lower viscosity plastisol with the same ratio of resin to plasticizer, and this ratio often is more or less fixed by the properties desired in the fused foam. Generally, the higher the proportion of plasticizer, the less rigid the resultant foam will be. Stir-in resins which have an average particle size of about one to two microns are generally preferred because of ease in forming the plastisol in conventional mixing apparatus, but, by selecting appropriate plasticizers, viscosity within the critical range may usually be attained even though the resin particle size is considerably smaller.

When grinding-type resins are employed, it usually is desirable or necessary to use a ball or pebble mill to break up the agglomerated resin particles to a sufficient degree to form the dispersion. With grinding-type resins the particle size is usually much smaller, ranging from a few hundredths up to some larger fraction of a micron in average size, and the increased surface exposed to the solvent action of the plasticizer produces a less stable plastisol from a viscosity standpoint, for as solvation occurs at the resin-plasticizer interfaces, the viscosity increases. Of course, if the plastisol is to be made up for immediate foaming and use, this partial solvation is not particularly disadvantageous.

Any of the organic plasticizers for vinyl resins which have little or no significant solvating action on the vinyl resin at room temperatures can be used in this invention. Illustrative of some of the well known organic plasticizer are tricresyl phosphate, dioctyl phosphate, phthalate plasticizers, such as di-2-ethylhexyl phthalate and other well known plasticizers or mixtures of two or more plasticizers. Generally speaking, the plasticizer should not have a significant solvating action for the resin at room temperature at least until the plastisol is foamed, and it should also have sufficiently low viscosity so as to produce a free flowing fluid plastisol, preferably one having a viscosity within the range of about 5,000 to about 50,000 centipoises. The amount and kind of plasticizer is usually dictated by the properties desired in the fused foam, and, if a relatively stiff foam is desired, smaller quantities of a more fluid plastizer may be employed as compared with larger quantities of a more viscous plasticizer for softer foams. Of course, the density and cell size of the foam also must be taken into account, but, because with the present invention it is possible to produce extremely light cellular products, there is much more latitude in the plastisol formulation than with the foaming process heretofore used.

Thus, as employed herein, the term "plastisol" is meant to include those plastisols of a vinyl resin and plasticizer in amounts providing free-flowing features, i.e., pourable, paint-like mixtures, which can be an admixture of resin and plasticizer, only or can be resin, plasticizer and viscosity modifier such as liquid foaming agents, volatile diluents for the plastisol and the like, or any similar mixture yielding a plastisol of free-flowing features.

Usually, in making up the plastisol, it is advantageous to add a small amount of metal soap such as aluminum stearate or barium and cadmium soaps as a dispersing agent to aid in maintaining the resin particles in suspension prior to foaming. Similarly, if desired, pigments, fillers or stabilizers for the vinyl resins may be employed in the plastisols to control the color, stability or other properties of finished foam and in some instances the use of volatile thinners such as are used in organosols may be advantageous.

In order to illustrate the practice of the invention the following examples are presented. All parts and percentages are by weight unless otherwise indicated.

*Example 1*

A plastisol having the composition:

| | |
|---|---|
| Resin: Poly(vinyl chloride) (specific viscosity determined as a 0.2 gram sample in 100 ml. nitrobenzene: 0.23) | 100 |
| Plasticizers: | |
| Mixed butyl-octyl phthalate | 52.5 |
| Butyl benzyl phthalate | 7.5 |
| Di(2-ethylhexyl)adipate | 5.0 |
| Heat stabilizers | 2.0 |
| Antimony oxide | 1.0 |
| Coconut fatty acid alkanolamide | 1.5 | was prepared by first mixing together the plasticizers and other additives and heating to form a melt and blending thoroughly. After the mixture cooled, it was combined with the resin. Any suitable milling or mixing apparatus can be used for this operation. The resulting product was a creamy liquid.

The product was divided into two portions. To the first portion 0.10 part by weight of a siloxane-oxyalkylene block copolymer per 100 parts by weight of poly(vinyl chloride) resin was added. The copolymer had the formula:

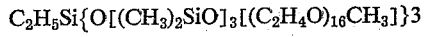

$$C_2H_5Si\{O[(CH_3)_2SiO]_3[(C_2H_4O)_{16}CH_3]\}_3$$

Nothing was added to the second portion. Each portion was made into foam by mixing with gas under high pressure, spraying the mixture into a suitable mold, and heating the mold until the plastisol fused. The foam formation techniques used were similar to that described by Schwencke in U.S.P. 2,666,036.

The foam made from the portion not containing the silicone copolymer was not of commercial quality. The surface was uneven, had a coarse texture, and did not easily permit the passage of air through it. The internal cell structure, too, was coarse and uneven. In contrast, the foam made from the portion containing the silicone copolymer had an even surface texture, a "breathable" surface skin, and a uniformly fine, internal cell structure.

*Example 2*

A plastisol was mixing having the same formulation as Example 1, except that a different lot of vinyl resin was used. Again, the plastisol was divided into two portions: 0.2 part by weight of a siloxane-oxyalkylene copolymer was added per 100 parts by weight of resin. The siloxane-copolymer used had the formula:

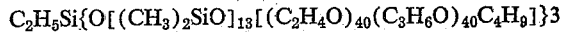

$$C_2H_5Si\{O[(CH_3)_2SiO]_{13}[(C_2H_4O)_{40}(C_3H_6O)_{40}C_4H_9]\}_3$$

The two portions were separately made into foam, as described in Example 1, and sprayed into a cushion mold. The portion not containing the silicone material collapsed in the mold before it could fuse; it could not be made into a commercially acceptable foam cushion. The portion containing the silicone copolymer was foamed and formed a high quality, acceptable foam cushion.

*Example 3*

A plastisol was prepared by the usual plastisol mixing techniques. The composition is indicated in the table below.

| Material: | Parts by weight |
|---|---|
| Resin—Poly(vinyl chloride) | 100 |
| Plasticizers— | |
| Mixed butyl-octyl phthalate | 47.5 |
| Butyl benzyl phthalate | 10.0 |
| Di(2-ethylhexyl)adipate | 10.0 |
| Heat stabilizers | 2.0 |
| Antimony oxide | 1.0 |
| Coconut fatty acid alkanolamide | 0.4 |

The above plastisol mixture was divided into two portions. To one portion was added 0.30 part by weight of a siloxane-oxyalkylene block copolymer for every 100 parts by weight of the poly(vinyl chloride) resin. The siloxane-oxyalkylene block copolymer used had the formula:

$$C_2H_5Si\{O[(CH_3)_2SiO]_3[(C_3H_6O)_{11}C_4H_9]\}_3$$

The separate portions were foamed by mixing with $CO_2$ under pressure, and the wet foam sprayed into separate cushion molds. The foam was fused by heating in an oven to about 160° C. The cushion formed from the portion not containing the silicone had many internal voids; the portions adjacent to corners and edges were void of foam. In contrast, the cushion made from the portion containing the silicone was free of such voids. The mold had been completely filled with foam, and the foam had a more even internal cell structure and finer textured surface than the foam not containing the silicone.

*Example 4*

A plastisol was prepared by the usual plastisol mixing techniques. The formulation is given below.

| | Parts by weight |
|---|---|
| Resins: Poly(vinyl chloride) (specific viscosity 0.23)[1] | 100 |
| Plasticizers: | |
| Mixed butyl-octyl phthalate | 42.5 |
| Di(2-ethylhexyl) phthalate | 10 |
| Butyl benzyl phthalate | 15 |
| Stabilizer | 2.0 |
| Coconut fatty acid alkanolamide | 1.0 |

[1] This resin is prepared similarly to the resin used in Example 1.

The above plastisol mixture was divided into two portions. To one portion was added 0.20 part by weight of a siloxane-oxyalkylene block copolymer for every 100 parts by weight of the poly(vinyl chloride) resin. The siloxane-oxyalkylene block copolymer used had the formula:

$$C_2H_5Si\{O[(CH_3)_2SiO]_6[(C_2H_4O)_{17}(C_3H_6O)_{13}C_4H_9]\}_3$$

The separate portions of the plastisol were formed into a wet foam. The foam was sprayed into two cored cushion molds and heated to a fusion in an oven. The portion not containing the silicone collapsed to a thick, integral piece and was scrapped. The portion containing the silicone yielded a commercially acceptable foamed cushion.

*Example 5*

The formulation of Example 4 was repeated, except that 0.20 part by weight per hundred parts by weight of resin of a siloxane-oxyalkylene copolymer was sprayed onto and mixed with the resin before the plastisol was mixed. The copolymer used had the formula:

$$C_2H_5Si\{O[(CH_3)_2SiO]_6[(C_2H_4O)_{26}(C_3H_6O)_{26}C_4H_9]\}_3$$

The plastisol was converted to a wet foam by mixing with $CO_2$ under pressure and spraying into an appropriate mold. After heating the plastisol to fusion, a fine-celled, lightweight foamed cushion was obtained.

What is claimed is:
1. A nonaqueous composition useful for producing uniformly textured vinyl foam which comprises a vinyl chloride resin plastisol and a siloxane-oxyalkylene block copolymer having a molecular weight above about 150, and comprising a mixture of block copolymers wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded to one end of the siloxane polymer through a carbon-oxy-silicon bond and bonded at the other end to a monoether radical.

2. Composition claimed in claim 1 wherein said siloxane-oxyalkylene block copolymer contains from 5 to 95 weight percent siloxane polymer and from about 95 to 5 weight percent alkylene oxide polymer.

3. The composition claimed in claim 2 wherein the said siloxane-oxyalkylene block copolymer has a molecular weight ranging from 2000 to 200,000.

4. The composition claimed in claim 2 wherein above about 0.01 part by weight of said siloxane-oxyalkylene block copolymer is incorporated in the plastisol per 100 parts by weight of the vinyl chloride resin.

5. The composition claimed in claim 4 wherein the siloxane-oxyalkylene block copolymer has the general formula

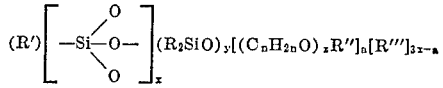

where R' is a hydrocarbon radical having the valence of $x$, R and R'' are monovalent hydrocarbon radicals, R''' is a member of the group consisting of alkyl radicals and $R_3Si-$ radicals, $x$ is an integer having a value of at least 1, $y$ is an integer having a value of at least 3, $n$ is an integer having a value of 2 to 4, $a$ is an integer having a value of at least one and not greater than $3x$ and $z$ is an integer having a value of at least 5.

6. The composition claimed in claim 5 wherein the siloxane-oxyalkylene block copolymer is present in an amount of about 0.10 part by weight.

7. The composition claimed in claim 5 wherein the siloxane-oxyalkylene block copolymer is present in an amount of about 0.20 part by weight.

8. The composition claimed in claim 5 wherein the siloxane-oxyalkylene block copolymer is present in an amount of about 0.30 part by weight.

9. The composition claimed in claim 2 wherein the vinyl chloride resin is a homopolymer.

10. The composition claimed in claim 2 wherein the vinyl chloride resin is a copolymer.

11. A finished vinyl foam characterized by having a highly uniform surface and internal cell texture comprising a cured vinyl chloride resin foam containing a siloxane-oxyalkylene block copolymer having a molecular weight above about 150 and comprising a mixture of block copolymers wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded to one end of the siloxane polymer through a carbon-oxy-silicon bond and bonded at the other end to a monoether radical.

12. The finished vinyl foam claimed in claim 11 wherein said siloxane-oxyalkylene block copolymer has a molecular weight between 2000 and 200,000 and is present in an amount above about 0.01 part by weight per 100 parts by weight of the vinyl chloride resin.

13. The finished vinyl foam claimed in claim 11 wherein said siloxane-oxyalkylene block copolymer has a molecular weight between 2000 and 200,000 and is present in an amount above about 0.01 part by weight per 100 parts by weight of vinyl chloride resin, said siloxane-oxyalkylene block copolymer containing from 5 to 95 weight percent siloxane polymer and from about 95 to 5 weight percent alkylene oxide polymer.

14. A finished vinyl foam characterized by having a highly uniform surface and internal cell texture comprising a cured vinyl chloride resin foam containing a siloxane-oxyalkylene block copolymer having a molecular weight between 2000 and 200,000 present in an amount above about 0.01 part by weight per 100 parts by weight of vinyl chloride resin, said siloxane-oxyalkylene block copolymer having the general formula

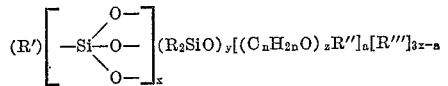

where R' is a hydrocarbon radical having the valence of $x$, R and R'' are monovalent hydrocarbon radicals, R''' is a member of the group consisting of alkyl radicals and $R_3Si$— radicals, $x$ is an integer having a value of at least 1, $y$ is an integer having a value of at least 3, $n$ is an integer having a value of 2 to 4, $a$ is an integer having a value of at least one and not greater than $3x$ and $z$ is an integer having a value of at least 5.

15. Method for producing uniformly surfaced and internal cell textured vinyl foam comprising the steps of forming a vinyl chloride resin plastisol, incorporating therein a siloxane-oxyalkylene block copolymer having a molecular weight above about 150, and comprising a mixture of block copolymers wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded to one end of the siloxane polymer through a carbon-oxy-silicon bond and bonded at the other end to a monoether radical introducing a gas into the plastisol under pressure and with agitation and discharging the resultant vinyl foam.

16. The method claimed in claim 15 wherein the siloxane-oxyalkylene block copolymer has a molecular weight between 2000 and 200,000 and contains from 5 to 95 weight percent siloxane polymer and 95 to about 5 weight percent alkylene oxide polymer and is incorporated in the vinyl chloride resin plastisol in an amount above about 0.01 part by weight per 100 parts by weight of the vinyl chloride resin.

17. The method claimed in claim 16 wherein the siloxane-oxyalkylene block copolymer has the general formula

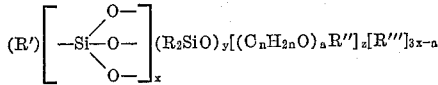

where R' is a hydrocarbon radical having the valence of $x$, R and R'' are monovalent hydrocarbon radicals, R''' is a member of the group consisting of alkyl radicals and $R_3Si$— radicals, $x$ is an integer having a value of at least 1, $y$ is an integer having a value of at least 3, $n$ is an integer having a value of 2 to 4, $a$ is an integer having a value of at least one and not greater than $3x$ and $z$ is an integer having a value of at least 5.

18. The method claimed in claim 17 wherein the siloxane-oxyalkylene block copolymer is incorporated in the vinyl chloride resin plastisol in an amount of from about 0.10 to about 0.30.

References Cited in the file of this patent

UNITED STATES PATENTS

| | | |
|---|---|---|
| 2,666,036 | Schwencke | Jan. 12, 1954 |
| 2,737,503 | Sprague et al. | Mar. 6, 1956 |
| 2,834,748 | Bailey et al. | May 13, 1958 |
| 2,917,480 | Bailey et al. | Dec. 15, 1959 |

UNITED STATES PATENT OFFICE
CERTIFICATE OF CORRECTION

Patent No. 3,061,558

October 30, 1962

Harvey Alter

It is hereby certified that error appears in the above numbered patent requiring correction and that the said Letters Patent should read as corrected below.

Column 3, line 59, the formula should appear as shown below instead of as in the patent:

$$(O_3SiR'SiO_3)(R_2SiO)_y[(C_nH_{2n}O)_zR'']_6$$

Signed and sealed this 30th day of April 1963.

(SEAL)
Attest:

ERNEST W. SWIDER
Attesting Officer

DAVID L. LADD
Commissioner of Patents